(12) United States Patent
Sanchez

(10) Patent No.: US 8,590,906 B1
(45) Date of Patent: Nov. 26, 2013

(54) GOLF BAG DOLLY ASSEMBLY

(76) Inventor: Carlos E. Sanchez, Miami, FL (US)

( * ) Notice: Subject to any disclaimer, the term of this patent is extended or adjusted under 35 U.S.C. 154(b) by 0 days.

(21) Appl. No.: 13/560,118

(22) Filed: Jul. 27, 2012

(51) Int. Cl.
*B62B 1/00* (2006.01)

(52) U.S. Cl.
USPC .................. 280/47.26; 280/79.11; 248/96

(58) Field of Classification Search
USPC ............... 280/79.5, 79.7, 47.25–47.26, 79.2, 280/47.33, DIG. 6, 47.17–47.18, 47.24, 280/47.131; 248/96
See application file for complete search history.

(56) References Cited

U.S. PATENT DOCUMENTS

| D265,392 S | * | 7/1982 | Baney | D34/15 |
| D364,020 S | | 11/1995 | Wang | |
| 6,460,867 B2 | | 10/2002 | Sciulli | |
| 6,513,816 B1 | * | 2/2003 | Kijima | 280/47.26 |
| 6,598,889 B1 | | 7/2003 | Su | |
| 6,918,604 B2 | * | 7/2005 | Liao | 280/47.26 |
| 7,114,730 B2 | | 10/2006 | Cheldin | |
| 7,229,082 B1 | * | 6/2007 | Wilmarth | 280/47.26 |
| 7,584,972 B2 | | 9/2009 | Myers et al. | |
| 2006/0249920 A1 | | 11/2006 | Lambert | |
| 2010/0237576 A1 | * | 9/2010 | Maccario | 280/47.26 |

* cited by examiner

*Primary Examiner* — John Walters
*Assistant Examiner* — James Triggs

(57) ABSTRACT

A golf bag dolly assembly attaches to the base of a golf bag to facilitate moving the golf bag. The assembly includes a base plate and a fixed wall coupled to and extending upwardly from the base plate. At least one arm is coupled to and extends from the fixed wall. A strap is coupled to and extends from the fixed wall and around the arm. The strap is configured for coupling the fixed wall and the arm in frictional engagement against a base of a golf bag whereby the base plate is coupled to the golf bag. A plurality of wheels is coupled to and extends from the base plate.

11 Claims, 6 Drawing Sheets

GOLF BAG DOLLY ASSEMBLY

BACKGROUND OF THE DISCLOSURE

Field of the Disclosure

The disclosure relates to dolly devices and more particularly pertains to a new dolly device for attachment to the base of a golf bag to facilitate moving the golf bag.

SUMMARY OF THE DISCLOSURE

An embodiment of the disclosure meets the needs presented above by generally comprising a base plate and a fixed wall coupled to and extending upwardly from the base plate. At least one arm is coupled to and extends from the fixed wall. A strap is coupled to and extends from the fixed wall and around the arm. The strap is configured for coupling the fixed wall and the arm in frictional engagement against a base of a golf bag whereby the base plate is coupled to the golf bag. A plurality of wheels is coupled to and extends from the base plate.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
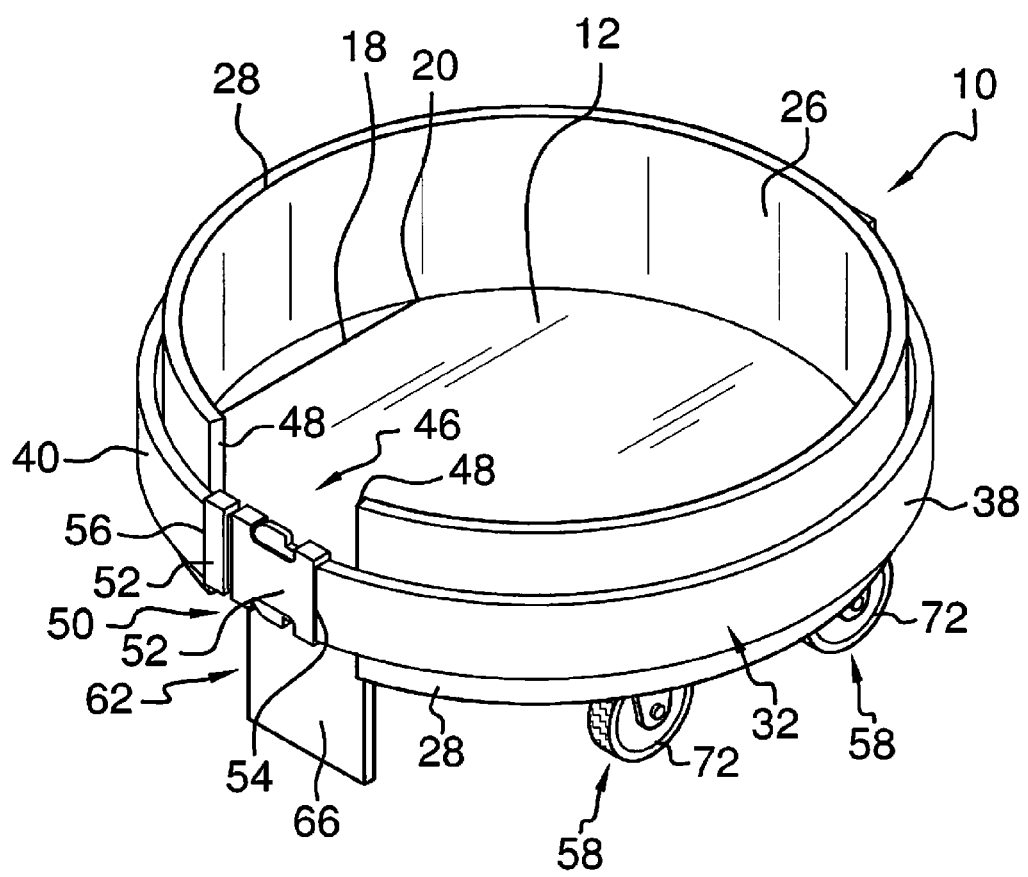
FIG. 1 is a top front side perspective view of a golf bag dolly assembly according to an embodiment of the disclosure.
Figure 2:
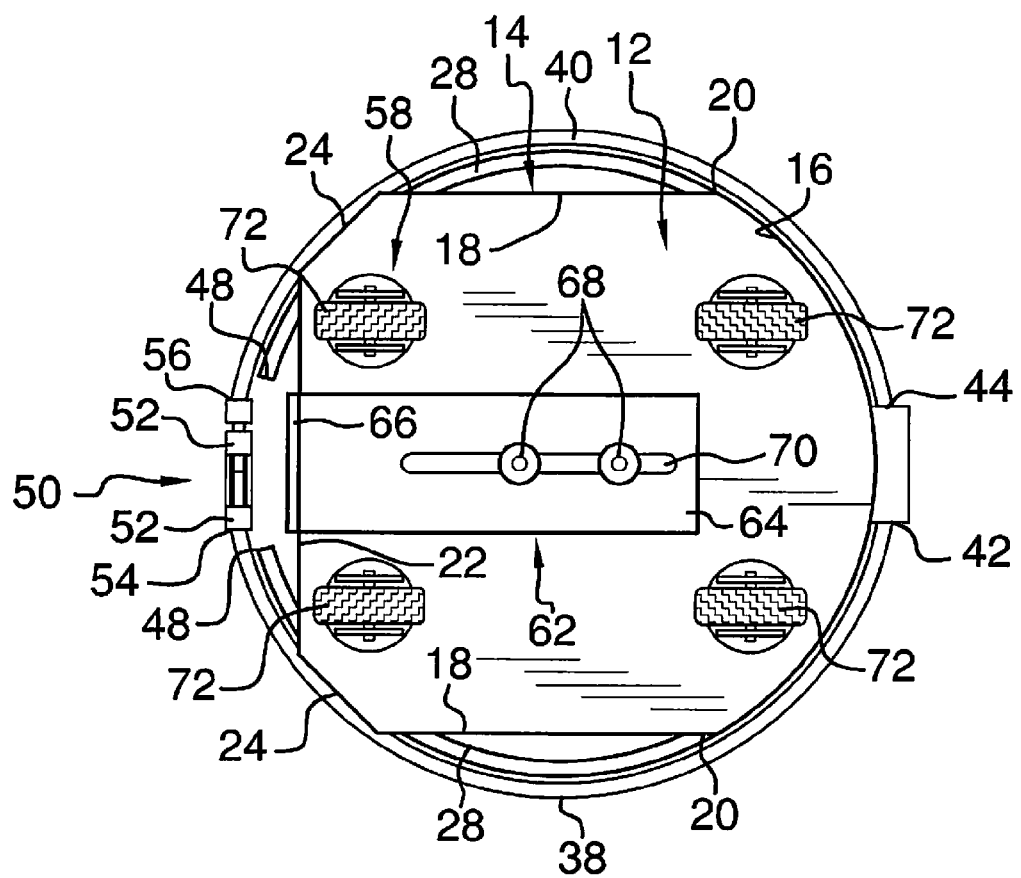
FIG. 2 is a bottom view of an embodiment of the disclosure.
Figure 3:
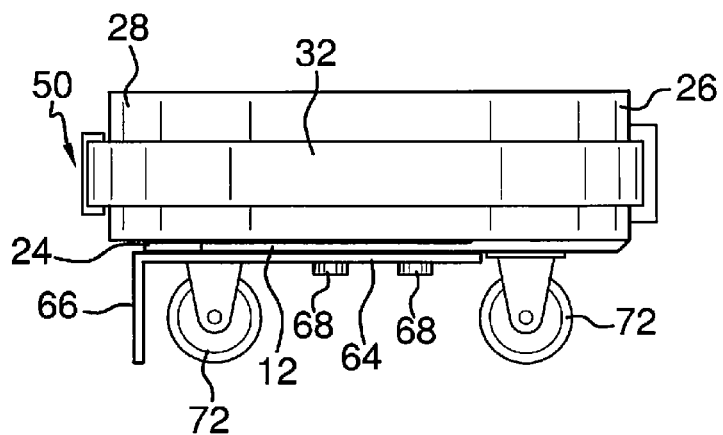
FIG. 3 is a side view of an embodiment of the disclosure.
Figure 4:
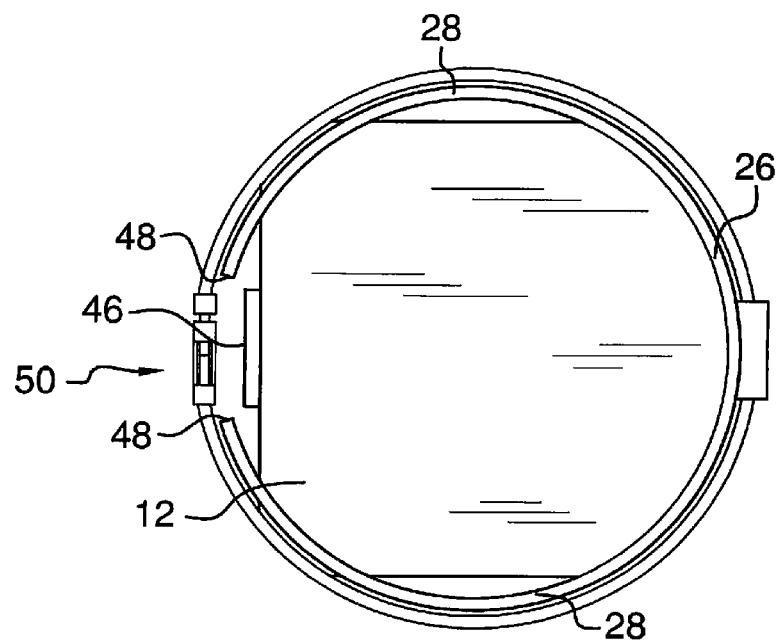
FIG. 4 is a top view of an embodiment of the disclosure.
Figure 5:
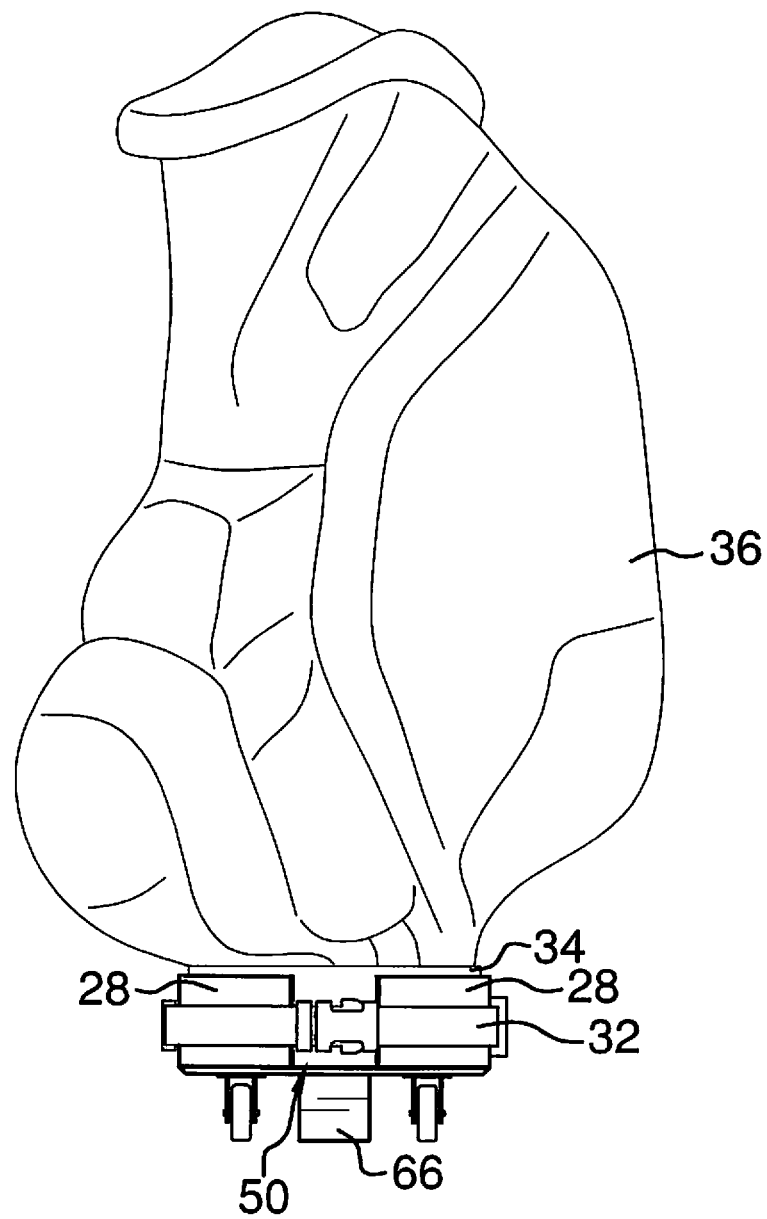
FIG. 5 is a front view of an embodiment of the disclosure in use.

With reference now to the drawings, and in particular to FIGS. 1 through 7 thereof, a new dolly device embodying the principles and concepts of an embodiment of the disclosure and generally designated by the reference numeral 10 will be described.

As best illustrated in FIGS. 1 through 7, the golf bag dolly assembly 10 generally comprises a base plate 12. An outer perimeter edge 14 of the base plate has an arcuate section 16, a pair of parallel lateral sides 18 extending from opposite ends 20 of the arcuate section 16, a straight distal side 22 relative to the arcuate section 16, and a pair of angled sides 24 each extending between the straight distal side 22 and an associated one of the lateral sides 18. An arcuate fixed wall 26 is coupled to and extends upwardly from the base plate 12 along the arcuate section 16. A pair of arcuate arms 28 are provided. Each arm 28 extends from an associated lateral side 30 of the fixed wall 26. Each arm 28 also extends away from the perimeter edge 14 of the base plate 12.

A strap 32 is coupled to and extends from the fixed wall 26 and around the arms 28. The strap 32 is configured for coupling the fixed wall 26 and the arms 28 in frictional engagement against a base 34 of a golf bag 36. Thus, the base plate 12 is coupled to the golf bag 36. The strap 32 has a first section 38 and a second section 40. The first section 38 and the second section 40 each have a first end 42, 44 fixedly coupled to the fixed wall 26. A gap 46 is formed between free ends 48 of the arms 28 for facilitating compression of the arms 28 against the golf bag 36 by the strap 32. A buckle assembly 50 has complimentary portions 52 coupled to free ends 54, 56 of the first section 38 and the second section 40 of the strap 32. The buckle assembly 50 is aligned with the gap 46 when the complimentary portions 52 are engaged.

A plurality of wheels 58 is coupled to and extend from the base plate 12. A stand 62 may be coupled to the base plate 12. The stand 62 has a connection section 64 coupled to the base plate 12 and a support section 66 extending downwardly from the connection section 64. A slot 70 extends through the connection section 64 of the stand 62. A pair of connectors 68 is provided. Each connector 68 extends through the slot 70. Each connector 68 frictionally couples the stand 62 to the base plate 12. Each connector 68 is movable to disengage the stand 62 from the base plate 12. Thus, the connectors 68 are selectively positionable within the slot 70 to extend or retract the support section 66 relative to the base plate 12.

Figure 6:
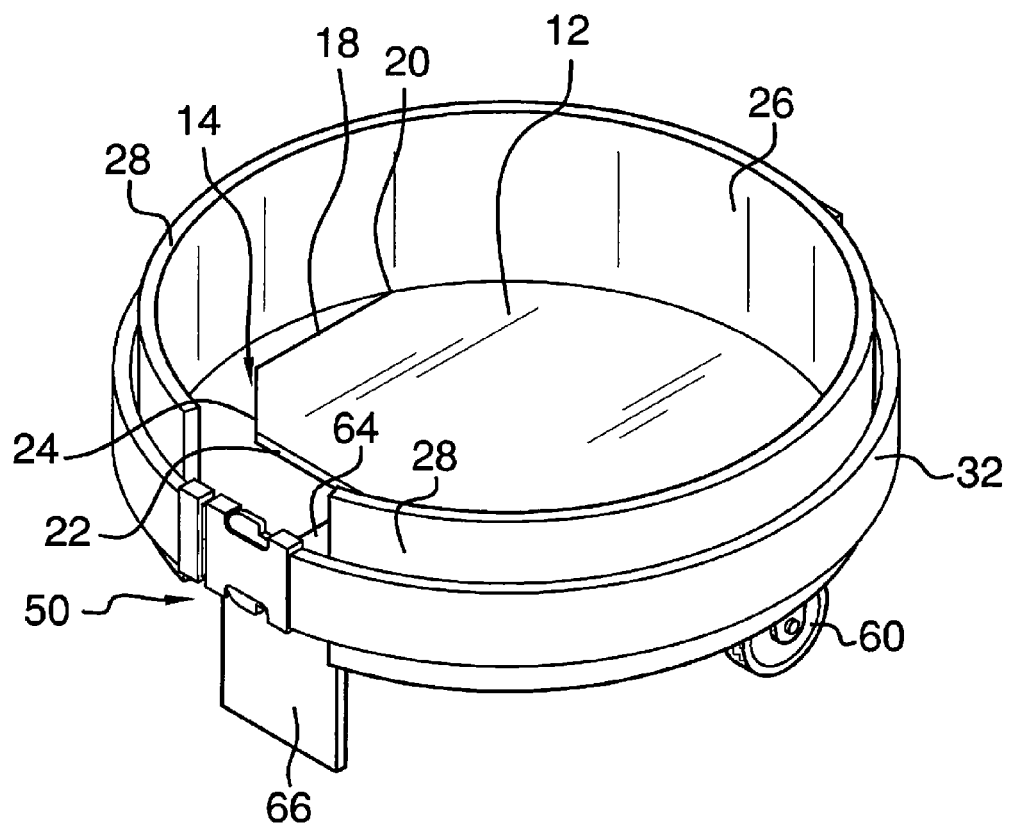
FIG. 6 is a top front side perspective view of an embodiment of the disclosure.
Figure 7:
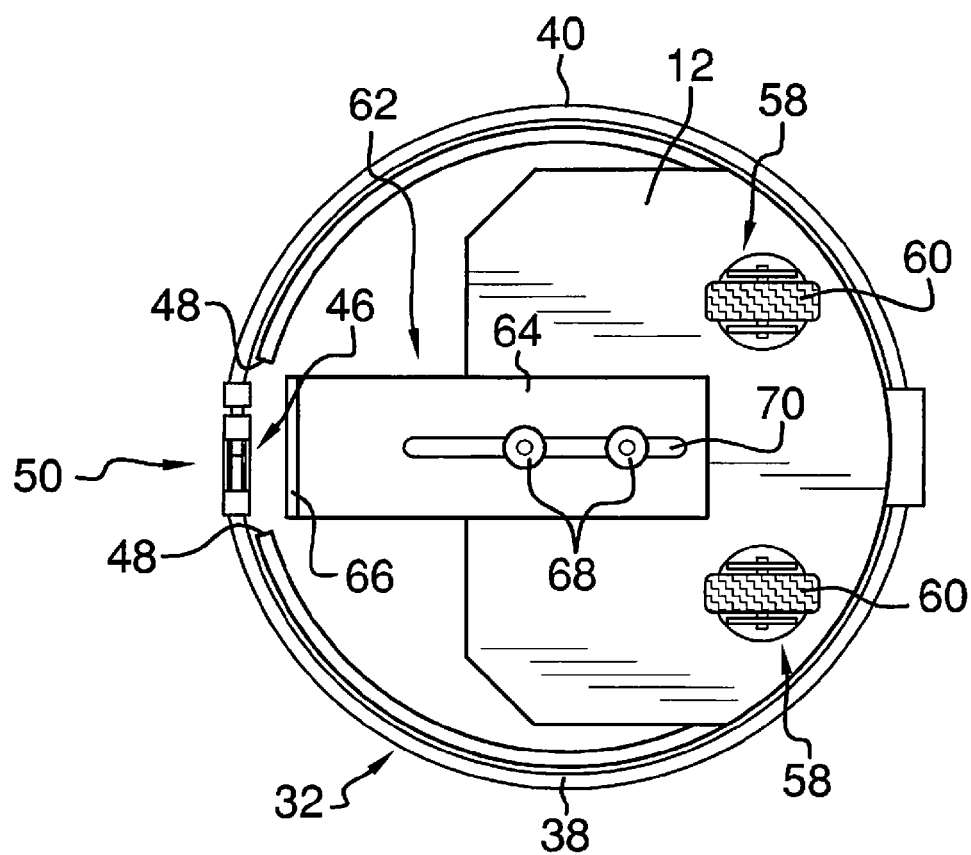
FIG. 7 is a bottom view of an embodiment of the disclosure.

The wheels 58 may be a pair of spaced wheels 60 as shown in FIGS. 6 and 7. A center of the base plate 12 is positioned between the support section 66 of the stand 62 and the wheels 60. Alternatively, as shown in FIGS. 1 through 5, the plurality of wheels 58 may be four wheels 72 arranged into a box surrounding the center of the base plate 12.

In use, the base 34 of the golf bag 36 is placed on the base plate 12 with the arms 28 extending around the base 34 of the golf bag 36. The strap 32 is secured to engage the arms 28 to the golf bag 36. The golf bag 36 may then be pushed on the wheels 58 as desired. The assembly 10 provides a low profile generally conforming to the shape of the base 34 of the golf bag 36 permitting the golf bag 36 to be positioned on and coupled to a golf cart without removing the assembly 10. However, the assembly 10 may be easily removed and stored in the golf cart during play if so desired.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A golf bag dolly assembly comprising:
   a base plate;
   a fixed wall coupled to and extending upwardly from said base plate;
   a pair of arms coupled to and extending from said fixed wall, said arms being arcuate wherein free ends of said arms face each other;
   a strap coupled to and extending from said fixed wall and around said arm, said strap being configured for coupling said fixed wall and said arm in frictional engagement against a base of a golf bag whereby said base plate is coupled to the golf bag;
   a gap being formed between said free ends of said arms for facilitating compression of said arms against the golf bag by said strap; and
   a plurality of wheels coupled to and extending from said base plate;
   a stand coupled to said base plate, said stand having a connection section coupled to said base plate, said stand having a support section extending downwardly from said connection section;
   a slot in said connection section of said stand; and
   a pair of connectors, each connector extending through said slot, each said connector frictionally coupling said stand to said base plate, each said connector being movable to disengage said stand whereby said connectors are selectively positionable within said slot to adjust a position of said stand relative to said base plate.

2. The assembly of claim 1, further including said fixed wall being arcuate.

3. The assembly of claim 1, further including each said arm extending away from a perimeter edge of said base plate.

4. The assembly of claim 1, further comprising:
   said strap having a first section and a second section, said first section and said second section each having a first end fixedly coupled to said fixed wall; and
   a buckle assembly having complimentary portions coupled to free ends of said first section and said second section of said strap.

5. The assembly of claim 4, further comprising:
   each said arm extending from an associated lateral side of said fixed wall; and
   said buckle assembly being aligned with said gap when said complimentary portions are engaged.

6. The assembly of claim 1, further including said plurality of wheels being a pair of spaced wheels, a center of said base plate being positioned between said support section of said stand and said wheels.

7. The assembly of claim 1, further including said plurality of wheels being four wheels.

8. The assembly of claim 1, further including an outer perimeter edge of said base plate having an arcuate section, a pair of parallel lateral sides extending from opposite ends of said arcuate section, a straight distal side relative to said arcuate section, and a pair of angled sides each extending between said straight distal side and an associated one of said lateral sides.

9. A golf bag dolly assembly comprising:
   a base plate, an outer perimeter edge of said base plate having an arcuate section, a pair of parallel lateral sides extending from opposite ends of said arcuate section, a straight distal side relative to said arcuate section, and a pair of angled sides each extending between said straight distal side and an associated one of said lateral sides;
   an arcuate fixed wall coupled to and extending upwardly from said base plate;
   a pair of arcuate arms, each said arm extending from an associated lateral side of said fixed wall, each said arm extending away from a perimeter edge of said base plate, free ends of said arms being positioned to face each other;
   a strap coupled to and extending from said fixed wall and around said arms, said strap being configured for coupling said fixed wall and said arms in frictional engagement against a base of a golf bag whereby said base plate is coupled to the golf bag, said strap having a first section and a second section, said first section and said second section each having a first end fixedly coupled to said fixed wall;
   a gap being formed between free ends of said arms for facilitating compression of said arms against the golf bag by said strap;
   a buckle assembly having complimentary portions coupled to free ends of said first section and said second section of said strap, said buckle assembly being aligned with said gap when said complimentary portions are engaged;
   a plurality of wheels coupled to and extending from said base plate;
   a stand coupled to said base plate, said stand having a connection section coupled to said base plate, said stand having a support section extending downwardly from said connection section;
   a slot in said connection section of said stand; and
   a pair of connectors, each connector extending through said slot, each said connector frictionally coupling said stand to said base plate, each said connector being movable to disengage said stand whereby said connectors are selectively positionable within said slots to adjust a position of said stand relative to said base plate.

10. The assembly of claim 9, further including said plurality of wheels being a pair of spaced wheels, a center of said base plate being positioned between said support section of said stand and said wheels.

11. The assembly of claim 9, further including said plurality of wheels being four wheels.

* * * * *